US012803490B2

(12) United States Patent
Kinoshita

(10) Patent No.: US 12,803,490 B2
(45) Date of Patent: Nov. 17, 2026

(54) ELECTRIC VEHICLE

(71) Applicant: TOYOTA JIDOSHA KABUSHIKI KAISHA, Toyota (JP)

(72) Inventor: Goki Kinoshita, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/883,525

(22) Filed: Sep. 12, 2024

(65) Prior Publication Data

US 2025/0125761 A1 Apr. 17, 2025

(30) Foreign Application Priority Data

Oct. 17, 2023 (JP) ................................ 2023-178560

(51) Int. Cl.

*H02P 21/00* (2016.01)
*B60L 58/27* (2019.01)
*H01M 10/615* (2014.01)
*H01M 10/625* (2014.01)
*H01M 10/63* (2014.01)
*H01M 10/6556* (2014.01)

(Continued)

(52) U.S. Cl.

CPC .............. *H02P 29/62* (2016.02); *B60L 58/27* (2019.02); *H01M 10/615* (2015.04); *H01M 10/625* (2015.04); *H01M 10/63* (2015.04); *H01M 10/6556* (2015.04); *H01M 10/66* (2015.04); *H01M 2220/20* (2013.01); *H02P 2207/05* (2013.01)

(58) Field of Classification Search

CPC .. H02P 29/62; H02P 2207/05; H01M 10/615; H01M 10/625; H01M 10/63; H01M 10/6556; H01M 10/66; H01M 2220/20; H01M 10/6567

See application file for complete search history.

(56) References Cited

U.S. PATENT DOCUMENTS

| | | | | |
|---|---|---|---|---|
| 8,536,809 | B2 | 9/2013 | Kojima et al. | |
| 2012/0200241 | A1* | 8/2012 | Kojima | B60L 15/025 318/139 |

(Continued)

FOREIGN PATENT DOCUMENTS

| | | | |
|---|---|---|---|
| JP | 2012-165526 | A | 8/2012 |
| JP | 2019-115218 | A | 7/2019 |

*Primary Examiner* — Muhammad S Islam

(74) *Attorney, Agent, or Firm* — Dinsmore & Shohl LLP

(57) ABSTRACT

An electric vehicle includes: first and second rotating electric machines for driving front wheels and rear wheels; a battery for supplying power to the rotating electric machines; a cooling liquid circulating circuit for collecting heat from the rotating electric machines with cooling liquid and supplying heat to the battery; and an electronic control device for controlling driving of the rotating electric machines. Further, the first rotating electric machine is a winding field motor, and when a temperature of the battery is desired to be raised during traveling, the electronic control device flow current only through stator coil with respect to the first rotating electric machine, collect heat with cooling liquid, supply the collected heat to the battery to raise the temperature of the battery, and perform control of outputting a driving force required for travelling with the second rotating electric machine.

6 Claims, 4 Drawing Sheets

(51) Int. Cl.
*H01M 10/66* (2014.01)
*H02P 29/62* (2016.01)

(56) References Cited

U.S. PATENT DOCUMENTS

2019/0193578 A1 6/2019 Fujiyoshi et al.
2020/0406783 A1 * 12/2020 Tokozakura ........ H01M 10/633

* cited by examiner

ELECTRIC VEHICLE

CROSS-REFERENCE TO RELATED APPLICATION(S)

The present application claims priority to and incorporates by reference the entire contents of Japanese Patent Application No. 2023-178560 filed in Japan on Oct. 17, 2023.

BACKGROUND

The present disclosure relates to electric vehicles.

In Japanese Laid-open Patent Publication No. 2012-165526, while setting the q-axis current value in accordance with the required driving force required for the running of the electric vehicle, a technique for setting the d-axis current value to promote the warm-up operation of the battery in cooperation with the q-axis current value is disclosed.

SUMMARY

There is a need for providing an electric vehicle capable of achieving both temperature rise of a battery and securing of a required driving force while running.

According to an embodiment, an electric vehicle includes: a first rotating electric machine for driving one of front wheels and rear wheels; a second rotating electric machine for driving another of the front wheels and the rear wheels; a battery for supplying power to the first rotating electric machine and the second rotating electric machine; a cooling liquid circulating circuit for collecting heat generated in the first rotating electric machine with cooling liquid and supplying the generated heat to the battery; and an electronic control device for controlling driving of the first rotating electric machine and the second rotating electric machine. Further, the first rotating electric machine is a winding field motor, in which a rotor coil is wound around a rotor core without providing a permanent magnet and a stator coil is wound around a stator core, and the electronic control device is configured to, when a temperature of the battery is desired to be raised during traveling, flow current only through stator coil without flowing current through the rotor coil with respect to the first rotating electric machine, collect heat generated by flowing current through the stator coil with cooling liquid in the cooling liquid circulating circuit, supply the collected heat to the battery to raise the temperature of the battery, and perform control of outputting a driving force required for travelling with the second rotating electric machine.

DETAILED DESCRIPTION

In the technique disclosed in Japanese Laid-open Patent Publication No. 2012-165526, it is difficult to secure the required driving force while raising the temperature of the battery while the electric vehicle is running, there is a possibility that causes unnecessary acceleration and deceleration by torque fluctuation.

An embodiment of an electric vehicle according to the present disclosure will be described below. Note that the present disclosure is not limited by the embodiment.

Figure 1:
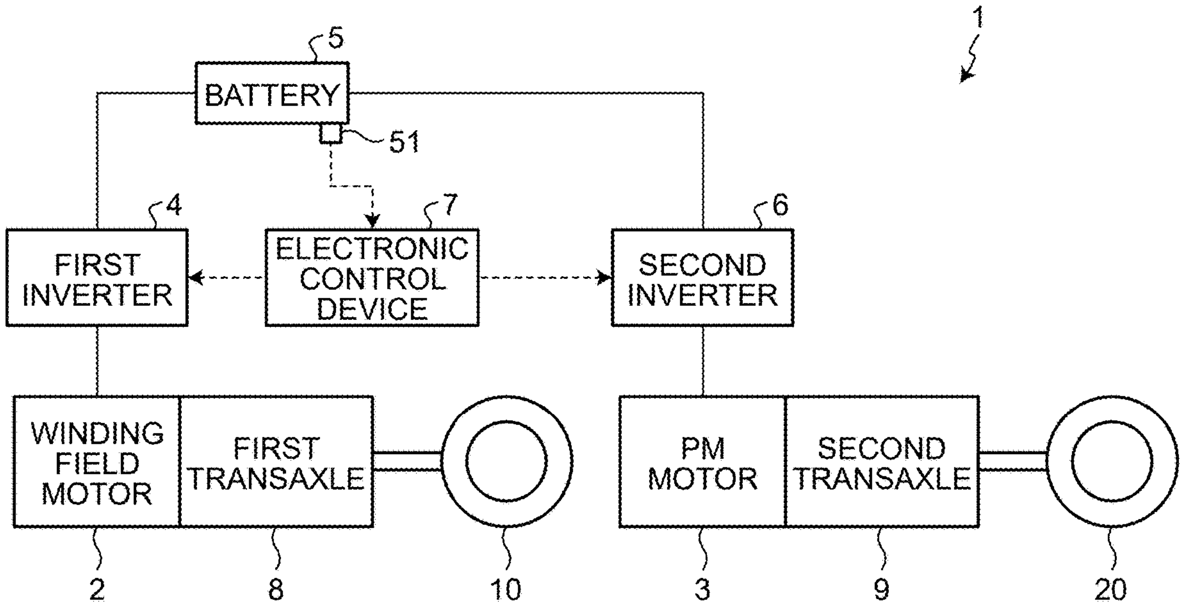
FIG. 1 is a diagram schematically illustrating an electric vehicle of an embodiment.

FIG. 1 is a diagram schematically illustrating an electric vehicle 1 of the embodiment. The Electric vehicle 1 includes a winding field motor 2, which is a first rotating electric machine for driving the front wheels 10, and a permanent magnet-type motor (PM motor) 3, which is a second rotating electric machine for driving the rear wheels 20. In the Winding field motor 2, the rotor coil is wound without providing a permanent magnet in the rotor core, and the stator coil is wound around the stator core. In the PM motor 3, the permanent magnets are provided on the rotor core, the stator coil is wound around the stator core.

Figure 2:
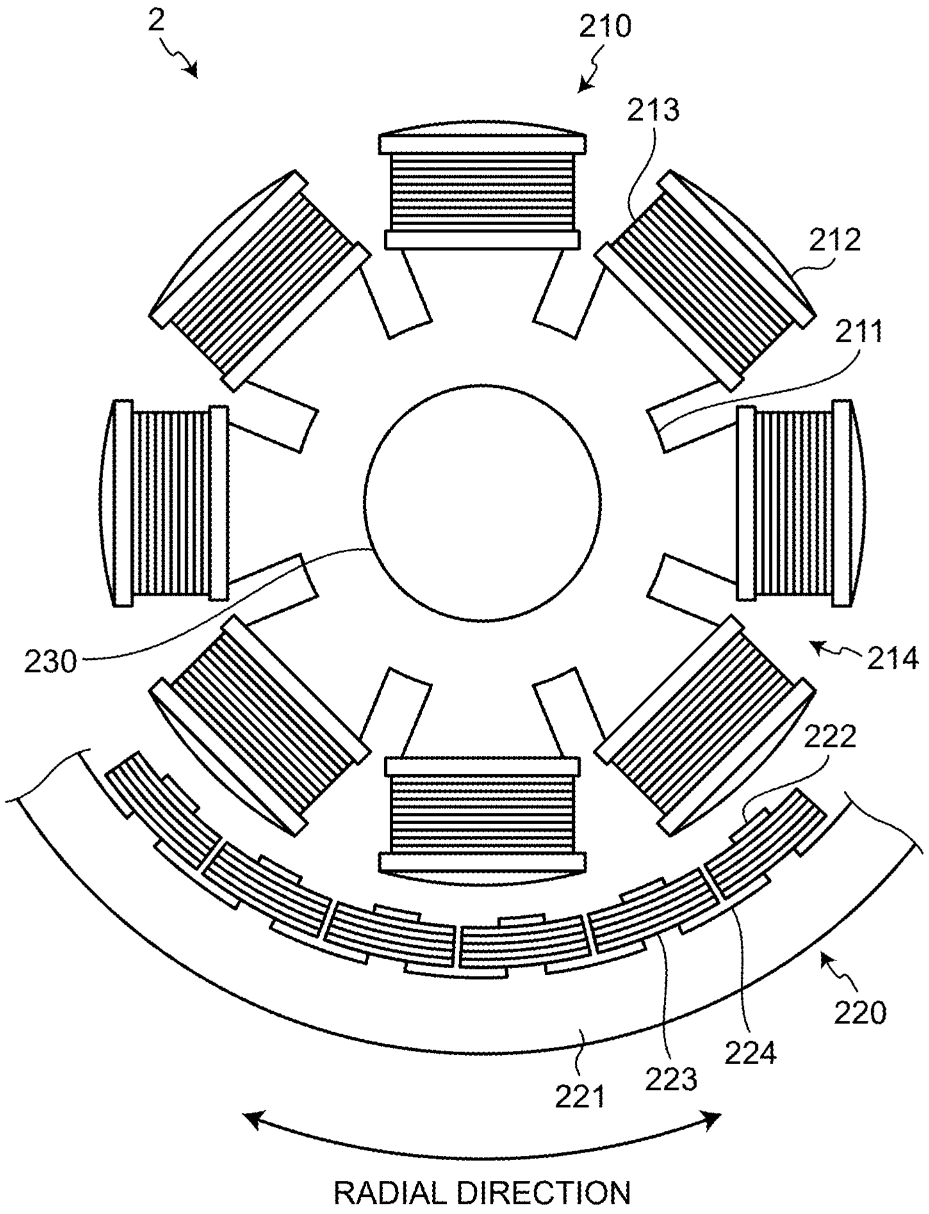
FIG. 2 is a diagram illustrating a schematic configuration of a winding field motor according to the embodiment.

FIG. 2 is a diagram illustrating a schematic configuration of a winding field motor 2 according to the embodiment. The winding field motor 2 according to the embodiment is constituted by a rotor 210 and a stator 220 and the like.

The rotor 210 is constituted by a rotor core 211, a plurality of rotor salient poles 212 disposed along the circumferential direction of the rotor core 211, and a rotor coil 213 wound around the rotor salient pole 212.

The rotor core 211 is an annular magnetic member including a plurality of rotor salient poles 212 which are arranged on the outer peripheral side, and having a shaft hole shaft 230 which is a rotation axis fixed at the center.

The rotor coil 213 is a field coil wound around the rotor salient pole 212. The rotor coil 213 is wound around the rotor salient pole 212 with a predetermined number of turns through the inside of a slot 214 formed between adjacent rotor salient poles 212.

The stator 220 is constituted by a stator core 221, a plurality of teeth 222 arranged along the circumferential direction of the stator core 221, and a stator coil 223 which is wound a plurality of times the teeth 222. Incidentally, in FIG. 2, although only a portion of the stator 220, an annular stator 220 is provided so as to surround the entire circumference of the rotor 210.

The stator core 221 is an annular magnetic member in which a plurality of teeth 222 are disposed on the inner peripheral side. The stator coil 223 includes a U-phase winding, V-phase winding, three-phase winding of the W-phase winding. Each phase winding, in accordance with a predetermined distributed winding arrangement method, through the slot 224 which is the space between the adjacent teeth 222, are sequentially wound on a predetermined tooth 222. Each winding of the stator coil 223 wound around the teeth 222, along the circumferential direction of the stator core 221, U-phase winding, V-phase winding, W-phase winding are sequentially arranged one turn.

Returning to FIG. 1, the electric vehicle 1 according to the embodiment includes a battery 5 which is a power storage device capable of supplying power to the winding field motor 2 and PM motor 3. The winding field motor 2 is electrically connected to the battery 5 through the first inverter 4. The PM motor 3 is electrically connected to the battery 5 through the second inverter 6. Then, by controlling the first inverter 4 and second inverter 6 by the electronic control device 7, it is possible to operate the winding field motor 2 and PM motor 3 to function as an electric motor or generator.

In the electric vehicle 1, a first transaxle 8 that transmits power (torque) output from the winding field motor 2 to the front wheels 10, and a second transaxle 9 that transmits power (torque) output from PM motor 3 to the rear wheels 20 are configured independently. The first transaxle 8 includes a first reduction gear and a first differential device. The second transaxle 9 is constituted by a second reduction gear and a second differential device. The winding field motor 2 is connected to the front wheels 10 through the first transaxle 8 for power transmission. The PM motor 3 is connected to the rear wheels 20 through the second transaxle 9 so as to transmit power.

Selection of driving of the winding field motor 2 and PM motor 3 by the electronic control device 7 is performed, for example, on the basis of a required driving force determined by a stepping amount of an accelerator pedal (degree of accelerator opening) and a vehicle speed, or on the basis of control of a temperature rise of the battery 5.

The electronic control device 7 controls the driving of the winding field motor 2 and PM motor 3. The electronic control device 7 also controls the first inverter 4 and the second inverter 6 for controlling the driving of the winding field motor 2 and PM motor 3. In addition, the electronic control device 7 implements control relating to state monitoring of the battery 5. The battery 5, a battery temperature sensor 51 for detecting the temperature of the battery 5 is attached. The electronic control device 7 can perform control related to the temperature increase of the battery 5, for example, included in the control related to the state monitoring of the battery 5 on the basis of the detection result of the battery temperature sensor 51.

Figure 3:
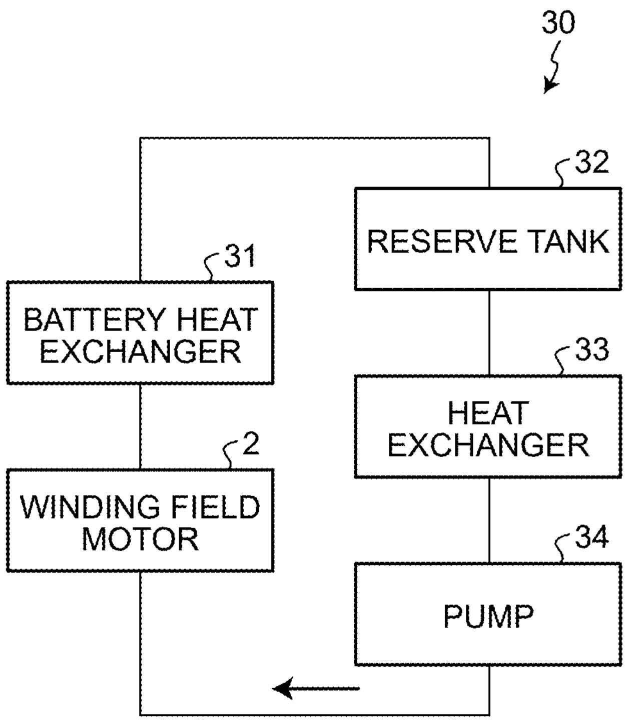
FIG. 3 is a diagram illustrating an example of the schematic configuration of the cooling liquid circulating circuit according to the embodiment.

FIG. 3 is a diagram illustrating an example of the schematic configuration of the cooling liquid circulating circuit 30 according to the embodiment. The electric vehicle 1 according to the embodiment includes a cooling liquid circulating circuit 30 for cooling the winding field motor 2 and controlling the temperature of the battery 5 as shown in FIG. 3. In the cooling liquid circulating circuit 30, the battery heat exchange unit 31, the reserve tank 32, the heat exchanger 33, and the pump 34 are arranged in this order.

The battery heat exchange unit 31 is provided in the battery 5 in order to exchange heat between the battery 5 and the cooling liquid. The reserve tank 32 stores a cooling liquid. The heat exchanger 33 is, for example, an air-cooled radiator, for cooling the cooling liquid. The pump 34 is, for example, an electric type, and circulates the cooling liquid in the direction of an arrow in FIG. 3 in the cooling liquid circulating circuit 30. Specifically, when the pump 34 is operated, the cooling liquid in the reserve tank 32 is supplied to the battery heat exchanger 31 through the heat exchanger 33. Coolant that has passed through the battery heat exchanger 31 returns to the reserve tank 32. Incidentally, the control of the pump 34 is performed by the electronic control device 7.

The cooling liquid circulating circuit 30 includes a flow passage of the cooling liquid for heat exchange between the winding field motor 2 and the cooling liquid. In the cooling liquid circulating circuit 30, the winding field motor 2 is disposed between the outlet of the pump 34 and the inlet of the battery heat exchanger 31 in the direction of the flow of the cooling liquid. Thus, the heat generated in the winding field motor 2 is recovered by the cooling liquid, cooling of the winding field motor 2 is made. Further, the heat recovered by the cooling liquid is transferred to the battery heat exchange unit 31 and is supplied to the battery 5 through the battery heat exchange unit 31. The cooling liquid circulating circuit 30 according to the embodiment is not limited to the configuration illustrated in FIG. 3 as long as heat generated by the winding field motor 2 can be transmitted to the battery 5. Further, in the electric vehicle 1 according to the embodiment, similarly to PM motor 3, a cooling liquid circulating circuit in which PM motor 3 is disposed instead of the winding field motor 2 having the same configuration as the cooling liquid circulating circuit 30 may be provided to transmit heat generated by PM motor 3 to the battery 5.

In the electric vehicle 1 according to the embodiment, on the basis of the detection result of the battery temperature sensor 51, when the temperature of the battery 5 is lower than the preset threshold temperature, the control related to the temperature increase of the battery 5 is performed. Here, the winding field motor 2 is a magnet-less motor, the magnetic flux is generated by passing a current to the rotor coil 213 (field coil), controls the driving force (torque) by the current flowing through the stator coil 223. In other words, the winding field motor 2, the driving force (torque) is not output unless the current flows to the rotor coil 213. Therefore, in the electric vehicle 1 according to the embodiment, when it is necessary to raise the temperature of the battery 5 (warm-up) during running, through the first inverter 4 from the battery 5 with respect to the winding field motor 2, the rotor coil 213 flows a current only to the stator coil 223 without a current, the heat generated by flowing a current to the stator coil 223, the cooling liquid of the cooling liquid circulation circuit 30 from the winding field motor 2 It is recovered and supplied to the battery 5, used for heating of the battery 5. Further, at this time, by flowing a current from the battery 5 to the stator coil of PM motor 3, PM motor 3 controls the driving force in running by outputting the required driving force.

Figure 4:
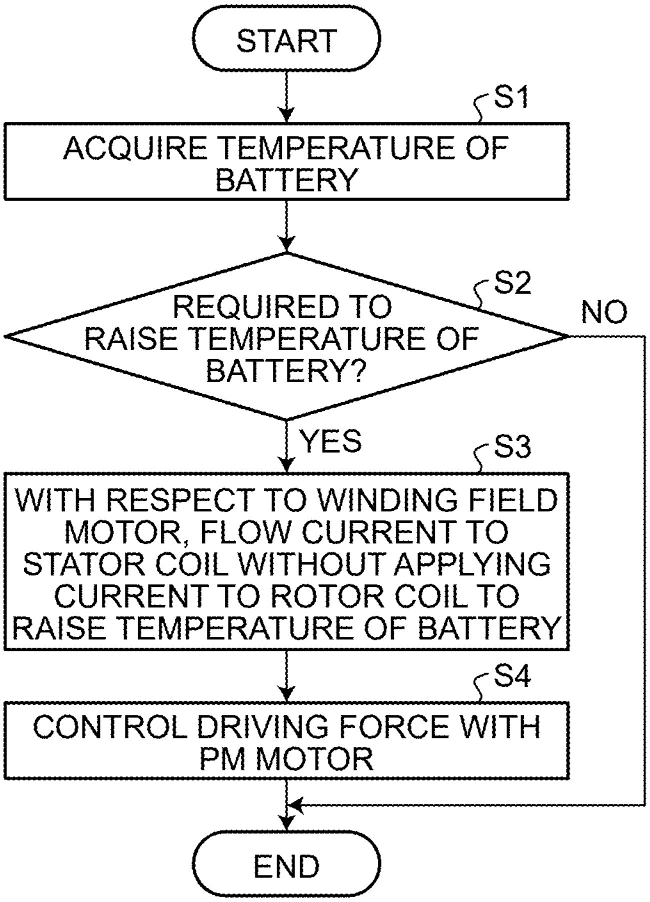
FIG. 4 is a flowchart illustrating an example of control relating to battery temperature rise and driving force control implemented by the electronic control device according to the embodiment.

FIG. 4 is a flowchart illustrating an example of control relating to battery temperature rise and driving force control implemented by the electronic control device 7 according to the embodiment. Incidentally, the control illustrated in FIG. 4 is performed while running the electric vehicle 1.

First, the electronic control device 7 acquires the temperature of the battery 5 detected by the battery temperature sensor 51 (Step S1). Next, the electronic control device 7 determines whether the temperature of the battery 5 needs to be raised (step S2). When the electronic control device 7, for example, determines that the temperature of the acquired battery 5 is equal to or higher than the threshold temperature set in advance, and the temperature rise of the battery 5 is not required (No at S2 of steps), the electronic control device 7 terminates the series of control. On the other hand, when the electronic control unit 7 determines that, for example, the temperature of the acquired battery 5 is lower than the threshold temperature and the temperature increase of the battery 5 is required (Yes in step S2), the process proceeds to step S3. In step S3, the electronic control device 7 flows a current to the stator coil 223 from the battery 5 with respect to the winding field motor 2, without applying a current to the rotor coil 213, collects heat, which is generated by flowing current through the stator coil 223 with coolant in the cooling liquid circulation circuit 30, and supplies the collected heat to the battery to raise the temperature of the battery 5 (step S3). Next, the electronic control device 7 flows a current from the battery 5 to the stator coil of PM motor 3, and controls the driving force by outputting the required driving force for traveling by the PM motor 3 (step S4). Thereafter, the electronic control device 7 terminates the series of control.

In the electric vehicle 1 according to the embodiment, for example, the electronic control device 7 implements the control related to the battery temperature rise and the driving force control as illustrated in FIG. 4, thereby achieving both the temperature rise of the battery 5 and the securing of the required driving force while the vehicle is running.

In the above-described embodiment, although the PM motor 3 is used as the second rotating electric machine for controlling the driving force during running, the second rotating electric machine may be used with a winding field motor in the same manner as the first rotating electric machine. That is, in the electric vehicle 1 according to the embodiment, if the winding field motor is used as the first rotating electric machine for raising the temperature of the battery 5 during running, the type of the second rotating electric machine for controlling the driving force is not particularly limited.

Further, in the electric vehicle 1 according to the embodiment described above, as illustrated in FIG. 1, the front wheels 10 are driven by the winding field motor 2, which is a first rotating electric machine, and the rear wheels 20 are driven by the PM motor 3, which is a second rotating electric machine. But the configuration is not always necessary. That is, in the electric vehicle 1 according to the embodiment, the rear wheels 20 may be driven by the winding field motor 2, which is a first rotating electric machine, the front wheels 10 may be drive by the PM motor 3, which is a second rotating electric machine motor.

In the electric vehicle according to the present disclosure has an effect that it is possible to achieve both the securing of the temperature rise and the required driving force of the battery during running.

According to an embodiment, it is possible to achieve both the temperature rise of the battery during running and the securing of the required driving force.

According to an embodiment, it is possible to control the driving force by passing a current to the stator coil of the second rotating electric machine.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric vehicle comprising:

a first rotating electric machine for driving one of front wheels and rear wheels;

a second rotating electric machine for driving another of the front wheels and the rear wheels;

a battery for supplying power to the first rotating electric machine and the second rotating electric machine;

a cooling liquid circulating circuit for collecting heat generated in the first rotating electric machine with cooling liquid and supplying the generated heat to the battery; and an electronic control device for controlling driving of the first rotating electric machine and the second rotating electric machine, wherein the first rotating electric machine is a winding field motor, in which a rotor coil is wound around a rotor core without providing a permanent magnet and a stator coil is wound around a stator core, and the electronic control device is configured to, when a temperature of the battery is desired to be raised during traveling, flow current only through the stator coil without flowing current through the rotor coil with respect to the first rotating electric machine, collect heat generated by flowing current through the stator coil with cooling liquid in the cooling liquid circulating circuit, supply the collected heat to the battery to raise the temperature of the battery, and perform control of outputting a driving force required for travelling with the second rotating electric machine.

2. The electric vehicle according to claim 1, wherein the second rotating electric machine is a permanent magnet type motor, in which a permanent magnet is provided on a rotor core of the second rotating electric machine and a stator coil of the second rotating electric machine is wound around a stator core of the second rotating electric machine.

3. The electric vehicle according to claim 2, wherein the electronic control device is configured to, while flowing current only through the stator coil without flowing current through the rotor coil with respect to the first rotating electric machine, flow a current to the stator coil of the second rotating electric machine to provide the driving force for the vehicle.

4. The electric vehicle according to claim 1, further comprising:

a first transaxle configured to transmit power output from the first rotating electric machine; and a second transaxle configured to transmit power output from the second rotating electric machine, wherein the first transaxle and the second transaxle are configured independently of each other.

5. The electric vehicle according to claim 1, wherein the cooling liquid circulating circuit includes a pump and a battery heat exchange unit provided in the battery, and wherein the first rotating electric machine is disposed between an outlet of the pump and an inlet of the battery heat exchange unit in a flow direction of the cooling liquid.

6. The electric vehicle according to claim 1, wherein a rotor of the first rotating electric machine includes a rotor core and a plurality of rotor salient poles disposed along a circumferential direction of the rotor core, and wherein the rotor coil is wound around each of the plurality of rotor salient poles.

* * * * *